Jan. 11, 1966  R. S. TRAUTVETTER  3,229,093
INFRARED FUZE TARGET SIMULATOR
Filed March 18, 1963

INVENTOR.
ROBERT S. TRAUTVETTER

3,229,093
INFRARED FUZE TARGET SIMULATOR
Robert S. Trautvetter, Rockville, Md., assignor to the United States of America as represented by the Secretary of the Navy
Filed Mar. 18, 1963, Ser. No. 266,103
12 Claims. (Cl. 250—83.3)
(Granted under Title 35, U.S. Code (1952), sec. 266)

The invention described herein may be manufactured and used by or for the Government of the United States of America for governmental purposes without the payment of any royalties thereon or therefor.

The present invention relates to a target simulator and more particularly to a spinning projectile, infrared detector wherein the passing of a target through the optical path of the detector is simulated.

The general purpose of this invention is to provide a target simulator having a large flat infrared radiating body and an infrared detector placed in the path of radiation from the body with a rotating disc having an aperture therethrough placed between the target and the infrared source to simulate the rotating projectile. Furthermore, a shutter means is located in the infrared path for passing the infrared radiation therethrough for a predetermined time to simulate the passing of a target through the field of the detector.

An object of the present invention is to provide an infrared spinning projectile target simulator.

A further object is to provide an apparatus to simulate, in geometric proportion, an infrared target source passing through the field of detection of a rotating projectile having an infrared detector.

Still another object is to provide a source of infrared radiation which will sequentially, in order, activate a plurality of infrared detectors.

Another object is to provide an apparatus to expose an infrared detector to a source of infrared radiation for a predetermined time.

Other objects and features of the invention will become apparent to those skilled in the art as the disclosure is made in the following description as illustrated in the accompanying sheet of drawing in which.

Figure 1:
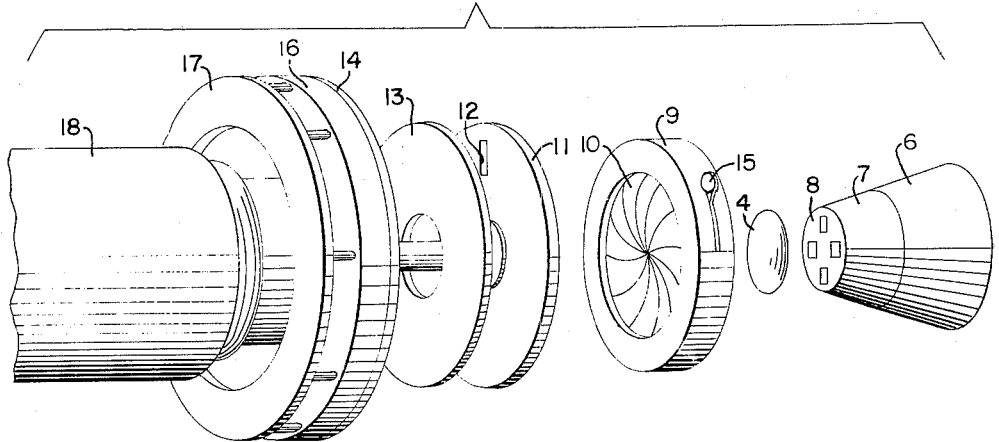
FIG. 1 is an exploded functional diagram illustrating the principal components of the system.

Referring now to the drawing, wherein like reference characters designate like or corresponding parts throughout the two views there is illustrated in FIG. 1 a fuze holder 6 holding a fuze 7 which has an infrared (IR) detector 8 and a lens 4 mounted on the front thereof. In the optical path of the IR detector is a shutter mechanism 9 and a circular disc 11 with an aperture 12 therethrough. Also in the optical path of the IR detector is a wind shield 13 formed of a material which transmits therethrough infrared radiation while at the same time forming a barrier to convection air currents produced by the circular disc 11. The material for the wind shield could conveniently be a thin mica sheet. The infrared radiation originates from the infrared radiating body 14, which is maintained at a constant elevated temperature by the heating coils enclosed within the body 16 and is supported by the supporting plate 17. Mounted on the infrared radiating body 14 are a plurality of thermocouples (not shown) for detecting the temperature of the radiating body. Also shown in FIG. 1 is an electric motor 18 for rotating the circular disc 11.

Figure 2:
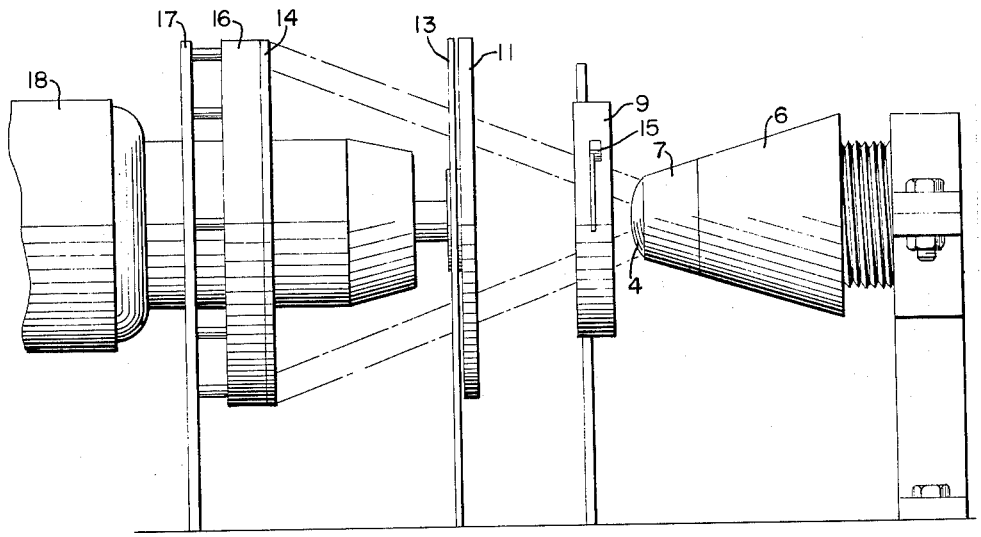
FIG. 2 is a side view of the elements assembled together showing the infrared radiation path from the infrared source to the detector.

In FIG. 2 there is illustrated the fuze holder 6, with its associated mounting, and fuze 7. In the path of the infrared radiation, indicated by the dashed lines, is the lens 4, shutter mechanism 9, the circular disc 11, the wind shield 13 and finally the infrared radiating body 14. The infrared radiating body 14 and the hot plate 16 are supported by the supporting plate 17, and all three members are in the shape of a toroid or donut having a hole in the center thereof to pass the shaft of the motor 18.

The flat hot plate 16 formed in the shape of a toroid has a pair of heating elements wound thereon, one of which encircles transversely the entire circumferential path of the hot plate, and the other is wound upon the lower portion only to compensate for the heat loss due to excessive conduction currents in the lower portion. A variable transformer or some current limiting means (not shown) is connected in series with each heating element in order to control the heat produced by each element. A plurality of thermo-couples (not shown) are affixed to the hot plate in order that the temperature of the hot plate may be ascertained. Under operating conditions a temperature in the range of 500° C. has been found to be satisfactory. The heat produced by the hot plate 16 heats the infrared radiating body 14 so that the body produces infrared radiation. Since the radiating body 14 is indirectly heated by the heating elements, it generally produces a uniform source of infrared radiation which does not vary rapidly while in use. The wind shield 13, placed between the radiating body 14 and the rotating circular disc 11, prevents excessive convection currents generated by the rotation of the disc from conducting away the heat from the radiating body 14.

The circular disc 11 is opaque to infrared radiation except in the place or places wherein an aperture is formed. The circular disc is rotated by the electric motor 18 to simulate the rotation of a spinning projectile seeking its target. The aperture within the disc 11 is cut in proportion to the infrared source as would be detected by the IR detector 8, for example, the exhaust of a jet engine. Although one aperture 12 is shown in the circulating disc a plurality could be formed to simulate a plurality of infrared sources as would be present on a multi-jet engine. The aperture 12 is not limited to target sources such as jet engines but can be any infrared source. Thus the rotating disc simulates both the spinning projectile as well as the approximate shape of the anticipated target source of infrared radiation.

The shutter 9 is of the commercial type having various time settings during which the shutter permits the infrared radiation to pass through by opening the plurality of shutter leaves 10 upon activation of the mechanical trip lever 15. A suitable type of commercial shutter is the No. 4 Acme Synchro having variable speeds from 1 to 1/150 of a second and manufactured by Ile Optical Company, Rochester, New York. The shutter 9 functions in cooperation with the infrared source and the rotating disc to simulate the passing of a target through the optical field of the IR detector 8 by exposing the IR detector 8 to the infrared radiation only for a predetermined time. This predetermined time simulates the time required for a target, such as a jet engine airplane, to pass through the optical field of the spinning projectile.

The IR detector 8 as illustrated has four distinct areas of sensitivity to infrared radiation. The four areas of sensitivity each forms one leg of variable resistance, dependent upon the intensity of the infrared radiation, of a conventional electrical bridge network (not shown) with a suitable detecting means being placed across two opposite terminals to detect any change in the balance of the bridge circuit. In this manner, with the four areas each forming one leg of the electrical bridge circuitry, changes in infrared radiation due to the sky do not effect the balance of the bridge since all four of the elements will be radiated and changing simultaneously. If one of the elements receives more radiation than the other elements an unbalance is detected in the bridge circuit thus signaling the occurrence of a target. One of the requirements for operation of the fuze is that the individual areas of sensitivity of the IR detector be individually radiated and in sequence. Another requirement is that a suitable means, such as the shutter, be provided for maintaining uniform radiation upon the four areas to simulate the conditions present in actual use when no target is in the optical path of the IR detector. A third requirement is that the lens focus the image on the detector.

The toroidal shaped hot plate 14 produces a source of continuous infrared radiation in the optical field of the IR detector which in cooperation with the rotating disc, having the aperture 12 therethrough, simulates both the jet plume and the rotation of the projectile. The shutter mechanism 9 cooperates with the hot plate and the rotating disc 11 to simulate the conditions of the jet target flying through the optical field of the IR detector 8 while the shutter is open. On the other hand, while the shutter is closed, this simulates the condition present when no target is within the optical field of the IR detector, that is, in which the IR detector is receiving equal radiation at all its spots of sensitivity. Thus the elements of the apparatus mutually cooperate to simulate the conditions present in actual use of either a target present in the field of the IR detector or the absence of a target with the IR detector receiving normal radiation.

It should be understood, of course, that the foregoing disclosure relates to only an illustrative embodiment of the invention and that numerous modifications or alterations may be made therein without departing from the spirit and scope of the invention as set forth in the appended claims.

What is claimed is:

1. An infrared target simulator comprising;
    a source of infrared radiation,
    a rotatable disc opaque to infrared radiation positioned in a path of the infrared radiation from said source and having at least one aperture therethrough geometrically proportioned to a target for passing the infrared radiation,
    motor means for rotating said disc,
    a timed shutter means positioned in the path of the infrared radiation for selectively passing the radiation during one period of time of predetermined duration and blocking the radiation during another period of time,
    and an infrared detector means positioned in the path of the infrared radiation passed by said shutter and said disc at the aperture thereof for detecting the change in intensity of the infrared radiation, whereby the radiation passed through the aperture in the rotating disc and the shutter means simulates a spinning target of a determined velocity when detected by the detector means.

2. Apparatus as recited in claim 1 further comprising; a shield means placed in the path of radiation between said source and said rotatable disc for reducing the convection current heat losses from said source.

3. Apparatus as recited in claim 2 wherein said shield means comprises a sheet of mica.

4. Apparatus as recited in claim 1 wherein said infrared detector comprises at least two distinct independent areas sensitive to infrared radiation.

5. Apparatus as recited in claim 1 wherein said source of infrared radiation is a uniformly heated toroidal body.

6. An infrared target simulator comprising;
    an infrared detector means for detecting infrared radiation,
    a source means for producing infrared radiation positioned in an optical path of said detector means,
    a rotatable disc means having at least one aperture therethrough geometrically proportioned to a target positioned between said source means and said infrared detector for simultaneously simulating a rotating projectile and a predetermined target of infrared radiation,
    motor means for rotating said disc means,
    and a timed shutter means positioned between said source means and said infrared detector for simulating the passage of the target through the optical path of said infrared detector.

7. Apparatus as recited in claim 6 wherein said detector means is composed of material which varies its electrical resistivity in accordance with the infrared radiation received.

8. Apparatus as recited in claim 6 wherein said source means for producing infrared radiation is a uniformly heated toroidal body.

9. Apparatus as recited in claim 6 wherein said shutter means comprises a plurality of shutter leaves for selectively passing infrared radiation during one period of time and blocks all infrared radiation during another period of time.

10. Apparatus as recited in claim 6 further comprising a shield means placed between said source means and said rotatable disc means for reducing convection currents producing heat loss from said source.

11. A device for generating infrared simulated target radiation comprising
    an annular uniform source of infrared radiation
    an infrared radiation opaque rotatable disc positioned in the path of said radiation having an aperture therein dimensioned in proportion to the simulated target to effectively transmit radiation in a pattern and path defining simulated infrared target radiation
    means for rotating said disc
    an infrared transmissive screen positioned between said disc and said source
    and closable aperture means in the path of said radiation defining an adjustable shutter for blocking and passing said radiation for preselected periods of time to provide radiation simulating that from the passage of said target through an optical path, whereby an infrared target detector responsive to target radiation in said optical path may be placed to receive and respond in like manner to said simulated target radiation.

12. A device for generating infrared simulated target radiation comprising
    an annular uniform source of infrared radiation,
    an infrared radiation opaque rotatable disc positioned in the path of said radiation and having an infrared radiation transmissive aperture therein having the configuration dimensioned in proportion to the target to be simulated, and said aperture being positioned to describe a predetermined path on rotation of said disc, to thereby effectively transmit radiation in a pattern and path defining simulated infrared target radiation,
    means for rotating said disc,
    an infrared transmissive screen positioned between said disc and said source and having means reducing air conduction current between said disc and source for enhancing the uniformity of radiation from said source, and closable aperture means in the path of said radiation defining an adjustable shutter blocking and passing said radiation for preselected periods of time to provide radiation simulating that from the passage of said target through an optical path, whereby an infrared target detector responsive to targe radiation in said optical path may be placed to receive and respond in like manner to said simulated target radiation.

References Cited by the Examiner

UNITED STATES PATENTS

| | | | |
|---|---|---|---|
| 2,941,085 | 6/1960 | Cuff | 73—1 |
| 3,065,347 | 11/1962 | Bossart | 250—83.3 |
| 3,081,399 | 3/1963 | Schwarz | 250—83.3 |
| 3,089,033 | 5/1963 | Fumisawa | 250—85 |
| 3,115,030 | 12/1963 | McHenry | 73—1 |

RALPH G. NILSON, *Primary Examiner.*

M. R. WILBUR, *Examiner.*